United States Patent [19]
Busch et al.

[11] Patent Number: 6,049,378
[45] Date of Patent: Apr. 11, 2000

[54] DEVICE AND METHOD FOR MUTUALLY ALIGNING BODIES

[75] Inventors: Dieter Busch, Ismaning; Michael Hermann, Villingen; Volker Konetschny, Putzbrunn; Heinrich Lysen, München, all of Germany

[73] Assignee: Pruftechnik Dieter Busch AG, Ismaning, Germany

[21] Appl. No.: 09/129,753

[22] Filed: Aug. 5, 1998

[30]       Foreign Application Priority Data

Aug. 5, 1997 [DE] Germany .............................. 197 33 919

[51] Int. Cl.$^7$ ...................................................... G01B 11/26
[52] U.S. Cl. ............................................ 356/138; 356/399
[58] Field of Search ...................................... 356/399, 400, 356/401, 138, 139.01, 139.03, 140, 141.3, 141.4, 141.5, 152.1, 152.2, 152.3; 250/208.4

[56]             References Cited

U.S. PATENT DOCUMENTS

| | | | |
|---|---|---|---|
| 3,637,312 | 1/1972 | Cantor et al. | 356/152 |
| 5,026,998 | 6/1991 | Holzl . | |
| 5,112,126 | 5/1992 | Graebner . | |
| 5,430,539 | 7/1995 | Lysen . | |

FOREIGN PATENT DOCUMENTS

| | | |
|---|---|---|
| 0 664 463 | 7/1995 | European Pat. Off. . |
| 38 14 466 | 11/1989 | Germany . |
| 39 11 307 | 10/1990 | Germany . |
| 195 46 405 | 6/1997 | Germany . |
| WO 97/23764 | 7/1997 | WIPO . |

*Primary Examiner*—Frank G. Font
*Assistant Examiner*—Tu T. Nguyen
*Attorney, Agent, or Firm*—Nixon Peabody LLP; David S. Safran

[57]                ABSTRACT

The spatial position of rollers or other mutually adjacent articles is measured or examined by indirect transport of a reference direction. To this end, an adaptor is placed on one of the rollers. The adaptor is equipped with a light source which emits a light beam substantially parallel to the axis of rotation of a roller. The light beam is sensed by a movable sensor unit. The latter determines, at the same time, the angle of incidence of the light beam according to two axes, relative to the sensor unit, and the orientation of the sensor unit relative to a reference axis system (laboratory system). A multi-axially operating gyroscope is used for the last-mentioned measurement. A suitably programmed electronic system or computer determines, from the two measured values, the orientation of the adaptor and of the roller with respect to azimuth and elevation in the laboratory system. The measured values which are determined can be utilized for the purpose of making a comparison with the corresponding values of further rollers or articles, so that an apparatus for parallelism measurements which is easy to handle is provided.

14 Claims, 4 Drawing Sheets

DEVICE AND METHOD FOR MUTUALLY ALIGNING BODIES

BACKGROUND OF THE INVENTION

1. Field of the Invention

The invention relates to a device and a method for mutually aligning bodies. In particular, the invention relates to the parallel alignment of shafts, rollers and similar rotationally symmetric bodies.

2. Description of Related Art

A method and device of the type to which the present invention is directed are known from published German Patent Application DE 195 46 405. That application contains a description of how angle data are obtained using, for example, a fibre-optic gyroscope having a position-measuring sensor. This makes it possible to determine, on the basis of the angle data, whether, and where appropriate, which position corrections need to be undertaken on bodies, specifically on shafts or rollers, which are to be aligned, in order to bring these into a desired state of alignment. For this purpose, it is necessary to apply the mentioned position-measuring sensor in a successively progressive manner, in each instance, to one of the bodies to be aligned. The position-measuring sensor is designed so that it is able to determine the angular position of the body relative to a spatially fixed reference coordinate system. However, for the purposes of the majority of practical applications, it is in this case only necessary that the angular position of the body with respect to the coordinates "azimuth" and "elevation" can be determined by the position-measuring sensor.

In this case, the bodies are, as a rule, to be measured with an accuracy which is within the range of fractions of a degree. In order to achieve such an accuracy, the optical gyroscopes mentioned in German Application DE 195 46 405, which are in accordance with the current prior art must, however, still have a certain overall size. In this case, typical overall sizes are cubic sensors having dimensions of approximately 200 mm×200 mm×200 mm. For a number of applications, such an overall size proves to be an obstacle, in particular, in the case of rollers of a closely jacketed roller train, or in the case of the rollers of an offset printing machine which are situated closely alongside one another and one above the other. Frequently, the frame-work or the racking for such rollers also obstructs their accessibility, so that the application of a relatively large sensor is associated with difficulties, and smaller sensors do not give the desired accuracy.

SUMMARY OF THE INVENTION

It is accordingly a primary object of the invention to provide a method and an associated system or device which is not hampered by the aforementioned disadvantages. This object is achieved with the provision of a combined position-measuring sensor having a receiving unit and an adaptor which can be fitted onto a body to be aligned, in particular a roller, and with a system emitting a light beam oriented parallel to a defined axis, specifically an axis of rotation of such a body or of such a roller, and wherein the receiving unit determines or computes an angular position of the adaptor and body or roller with respect to a laboratory system by the performance of the following functions: a) determination of the specific angular alignment of the receiving unit relative to the coordinates of a predetermined spatially fixed coordinate system (laboratory system) b) determination of the direction of reception of the light beam relative to the specific housing dimensions of the receiving unit c) computation of the laboratory-system angular position of the adaptor on the basis of measured values which have been obtained by means of functions a) and b), with the use of an electronic system fitted within the receiving unit or by an internally or externally fitted computer.

In this case, the invention proceeds from the following finding: it is indeed particularly practical to effect a directional comparison of bodies in that a direction measuring sensor is transported from one to the other body to be referenced. However, this direct procedure is not obligatory. Rather, it is also possible according to the invention to employ an indirect procedure. According to the invention, this is advantageous, in particular, in circumstances in which the mentioned rollers or bodies are relatively inaccessible, as described above.

Accordingly, the present invention provides for the determination of the direction of a body in that a suitable, relatively small-volume adaptor is connected in a defined manner to body, the angular alignment in space of which is to be measured relative to a stationary coordinate system (frequently designated as the laboratory coordinate system). This adaptor represents a first part of a combined position-measuring sensor having essentially two components. In this case, the alignment of the adaptor is preferably such that one of its principal axes necessarily comes to lie parallel to a defined axis of the body when the adaptor is fitted to the body. This defined axis may be, for example, the axis of rotation of a roller or shaft or the like. Overall, the adaptor which is provided has a relatively small volume. As part of a combined position-measuring sensor, comprised of a plurality of components, the adaptor rather carries out only indirect measurement functions. In this case, it represents an independent light source and is capable of emitting a light beam. To generate such a light beam, there is preferably provided a semiconductor laser, in particular a battery-operated semiconductor laser.

The relative angular position of the adaptor, and thus the relative angular position of the body to be measured, is then, according to the invention, indirectly determined with the aid of a supplementary system. The supplementary system thus represents a second part, specifically the actively measuring part, of a combined position-measuring sensor. Specifically, it is also capable of carrying out the functions of a gyroscope (gyro) and can accordingly establish its own orientation in space with respect to a laboratory system. If it is used at the same time as a receiving unit for a light beam, e.g. a laser beam, then it can, in this case, directionally evaluate the direction of an incident light beam. In the final effect, it is accordingly possible to determine the relative position of the body, related to a laboratory system which is taken as a basis. As mentioned, the body may specifically be a roller. The direction finding is simplified if, in a specific case, the supplementary system is to detect only those light beams which are incident from an individual, prescribed direction. In both cases, however, conclusions can be drawn directly from the relative position of the mentioned supplementary system and from the angles of incidence, as to the relative position of the body to be measured. In this case, it is in each instance presupposed that the mentioned adaptor has been fitted onto the body in such a way that the light beam emitted by it is oriented parallel to a body-specific preferred axis. By reason of the use of an adaptor having its own light-beam generation, the aforementioned method can be designated as an "emissive" method.

Using the mentioned method, it is accordingly possible to determine in successive sequence the alignment of a first, second etc. body in a laboratory coordinate system, and specifically by means of a relatively small-volume sensor part (adaptor) having a diameter of approximately 15–30 mm. In summary, it can be stated that the invention relates to a device or an associated method for mutually aligning bodies, in particular for the parallel alignment of shafts, rollers or rotationally symmetric bodies, and comprises a combined position-measuring sensor. The position-measuring sensor is comprised of a receiving unit and an adaptor, which can be fitted onto a body to be aligned, in particular a roller, in such a way that preferred axes of adaptor and body or roller are oriented so as to be parallel, and which adaptor is provided with a system emitting a light beam, and wherein the lightbeam of an adaptor fitted onto a body or a roller is oriented parallel to a defined axis, specifically an axis of rotation of such a body or of such a roller, and wherein the receiving unit effects the simultaneously occurring determination of an angular position of adaptor and body or roller with respect to a laboratory system by the performance of the following functions: a) determination of its own angular alignment relative to the coordinates of a predetermined spatially fixed coordinate system (laboratory system), b) determination of the direction of reception of a light beam, according to two angular coordinates, relative to its own housing dimensions, c) computation of the laboratory-system angular position of the adaptor on the basis of measured values which have been obtained by means of functions a) and b), with the use of its own electronic system or by an internally or externally fitted computer.

These and further objects, features and advantages of the present invention will become apparent from the following description when taken in connection with the accompanying drawings which, for purposes of illustration only, show several embodiments in accordance with the present invention.

DETAILED DESCRIPTION OF THE INVENTION

Figure 1:
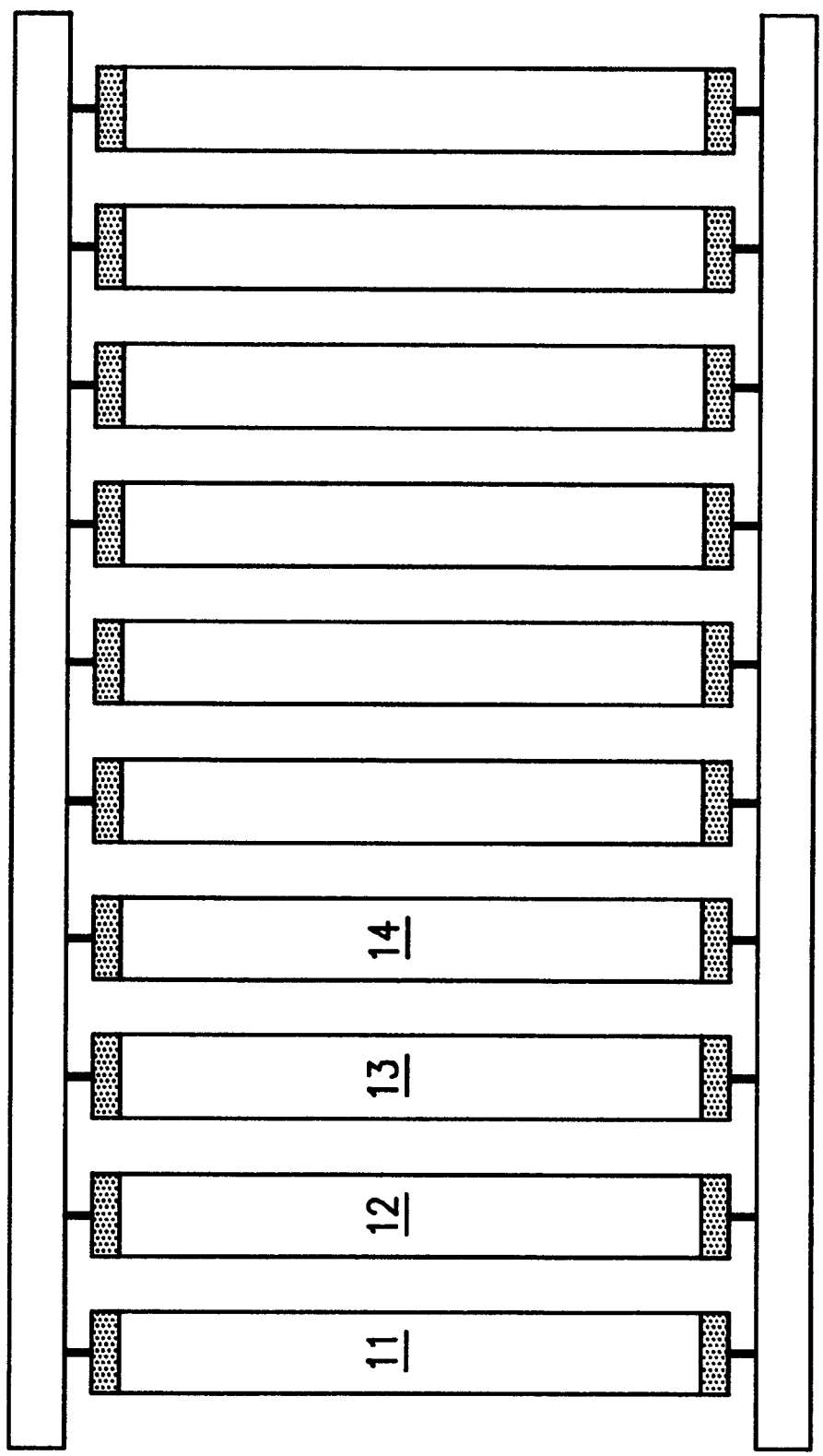
FIG. 1 shows an arrangement of bodies which are to be aligned parallel to one another and perpendicular to a framework.
Figure 2:
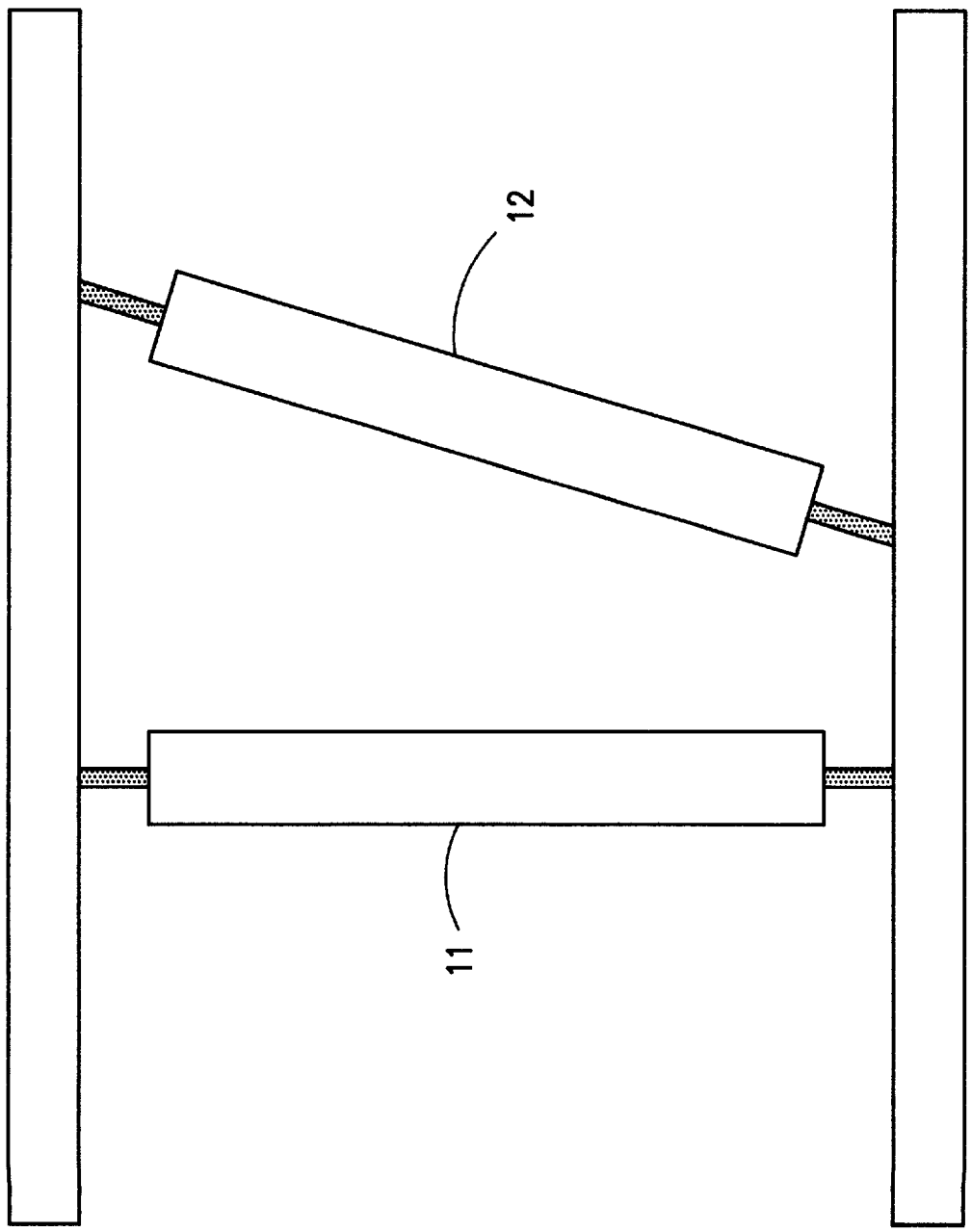
FIG. 2 shows the skew position of two bodies according to FIG. 1 on a greatly enlarged scale.

As is shown in FIG. 1 and FIG. 2, to align, for example, rollers 11, 12, 13, 14, etc. which are disposed in a substantially parallel manner alongside one another, it is necessary to align these rollers both in a horizontal plane (azimuth alignment) and also with respect to a vertical plane (elevation alignment). (The terms likewise employed in a similar context, such as height alignment, lateral alignment, transverse alignment, or pitch, yaw, roll etc., are familiar to the person skilled in the art. However, to avoid instances of confusion, the terms azimuth and elevation are preferably used for the invention described here.) The specification of a third reference angle can, in this context, normally be dispensed with.

Figure 3:
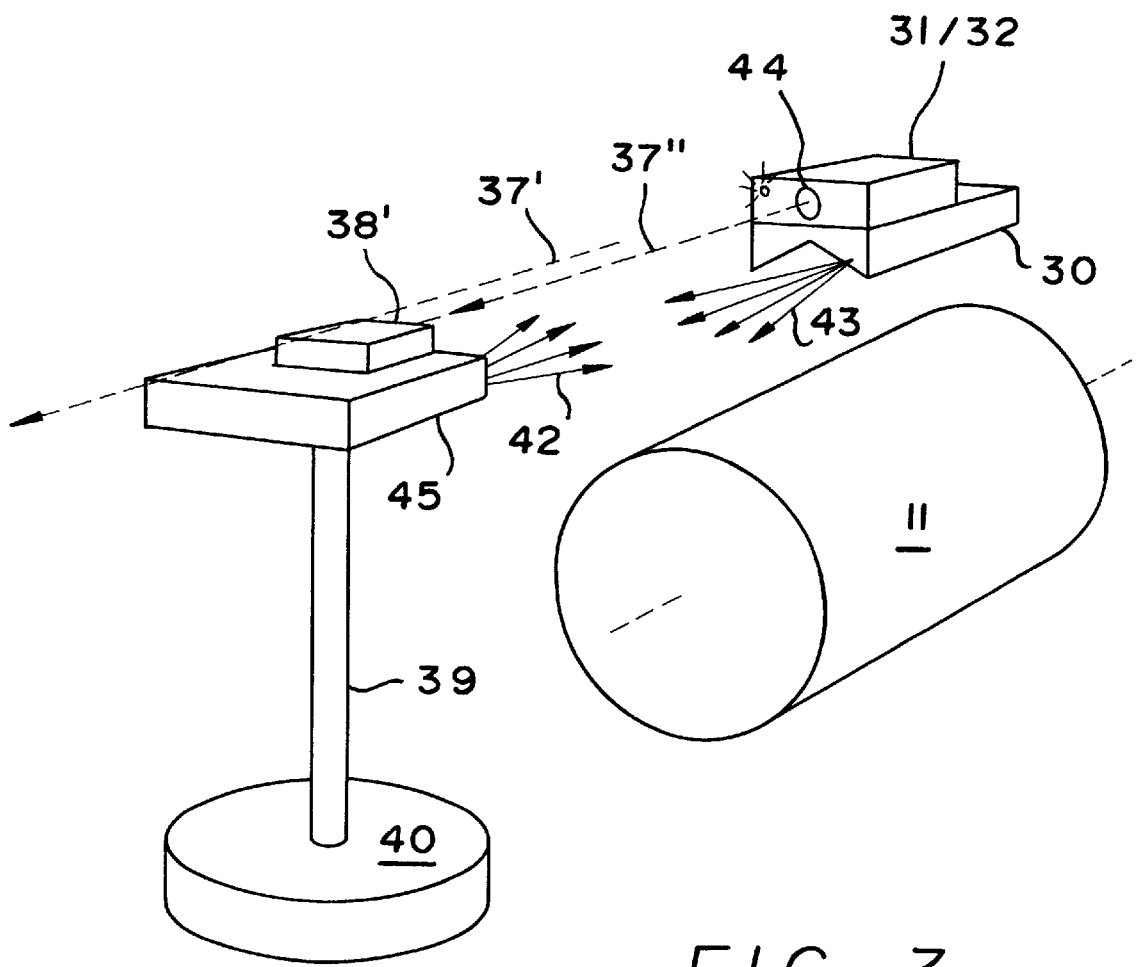
FIG. 3 shows a basic arrangement of components of an emissively operating position-measuring sensor relative to a body to be measured.

According to the invention (cf. FIG. 3), the alignment of such bodies, specifically in the form of rollers, takes place in two directions in space (and with respect to a laboratory system), in that a prismatic or v-shaped adaptor 30 is fitted onto a roller 11. This adaptor 30 can have a v-shaped that extends in the axial direction of the roller 11 shown (which is also representative of rollers 12, 13, etc.), or it can be designed in a more stable fashion with an attachment 32. At, or in, the adaptor there is fixedly fitted a semiconductor laser 44 which can be activated and deactivated, and is preferably supplied with electricity from a battery. The electrical supply can also take place via a portable connecting cable. The adaptor is prepared in such a way, and the semi-conductor laser is fitted at or in the adaptor in such a way, that the direction of emission of the laser is oriented parallel to the axis of rotation of the roller 11 when the adaptor 30 is placed on roller 11.

According to the invention, a receiving unit 45 is fitted or retained, at least for a short period and possibly more permanently, in such a way that it can be struck by the laser beam. By reason of its design with an incorporated gyroscope, it can determine its own orientation relative to the coordinates of a laboratory system, determine the direction of an incident laser beam and relate the two data to one another in such a way that the relative orientation of the laser 44, and consequently the orientations of the adaptor 30 and of the roller 11 can be computed. (In a simplified embodiment, the receiving unit is mounted on a displaceable stand 39, 40).

The light beam 37" strikes the receiving surface of a suitable beam detector, which is known per se and which is situated within the receiving unit 45. In particular, it is advantageous to select, for such an optoelectronic beam detector, a two-layer sensor which is able, for two planes, to determine the positions of an incident light beam in x coordinates and y coordinates in each instance and to output these in the form of an electrical signal. By this means, it is possible to determine the direction of an incident light beam relative to the sensor axes, and thus, relative to the dimensions (principal axes) of the receiving unit 45. The beams 42, 43 symbolize the radiation field of a possibly additionally provided system for range-finding between the adaptor 30 and the receiving unit 45.

Figure 4:
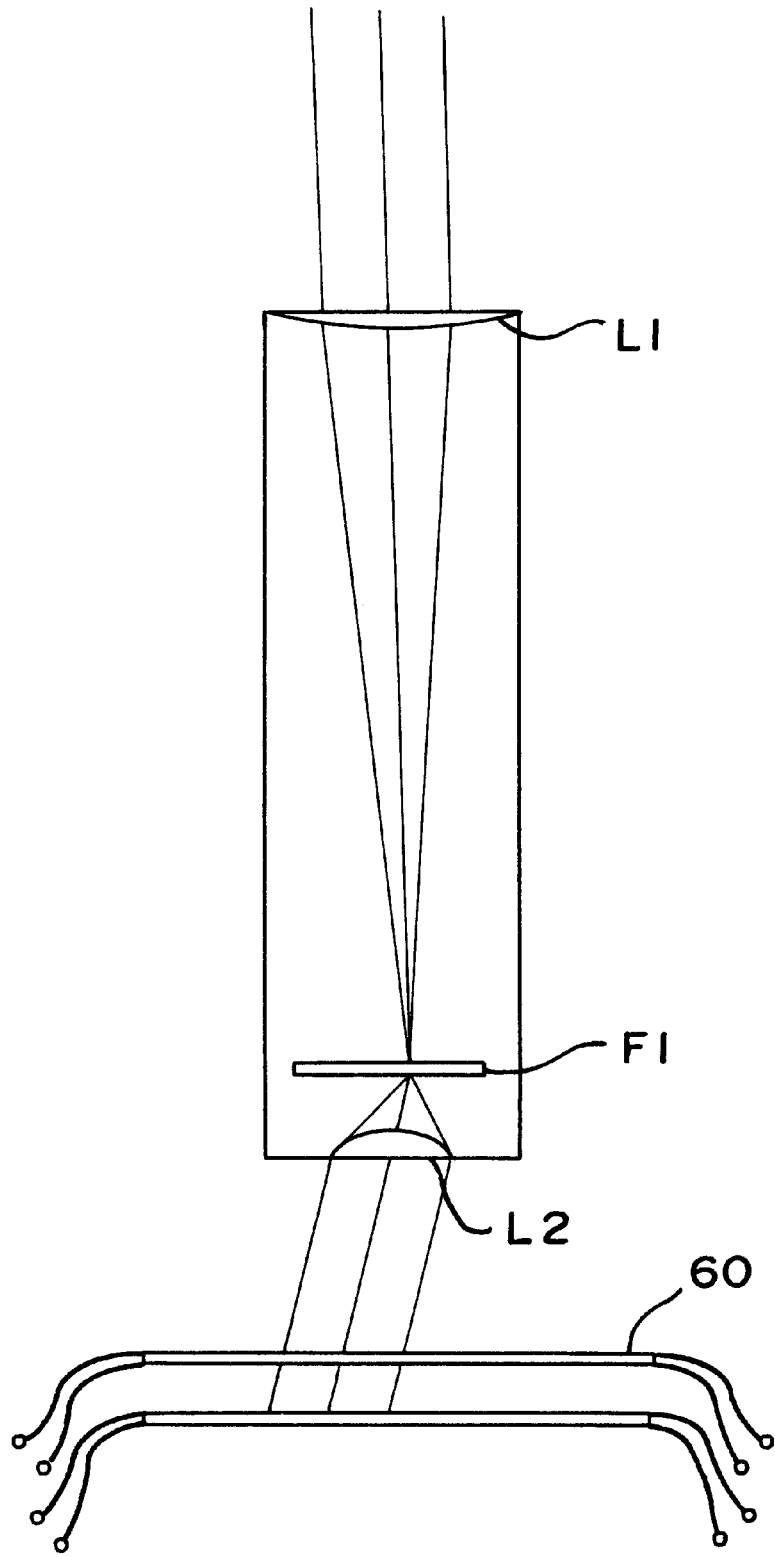
FIG. 4 shows advice for measuring the direction of an incident light beam, with the use of a telescope.

According to FIG. 4, an optical system in the form of a telescope having lenses L1, L2 can be used to represent, in linearly enlarged form, small angle deviations of a light beam incident into a receiving unit 45 or sensor housing 38', so that the effective resolution of an optoelectronic sensor 60 is improved.

While various embodiments in accordance with the present invention have been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

We claim:

1. Device for mutually aligning bodies with a combined position-measuring sensor, comprising a light emitting system for emitting a light beam oriented parallel to a defined axis, an adaptor with which the light emitting system is mountable onto a body to be aligned parallel to a longitudinal axis thereof, a receiving unit for receiving said light beam and having means for determining its own orientation relative to a predetermined spatially fixed coordinate system, and electronic computing means for a determining azimuth and elevation angular positions of the adaptor and body with respect to said predetermined spatially fixed coordinate system by a) determining a specific angular alignment of the receiving unit relative to coordinates of the predetermined spatially fixed coordinate system b) determining a direction of reception of the light beam from the light emitting system relative to specific housing dimensions of the receiving unit c) computing of the angular position of the adaptor relative to the predetermined spatially fixed coordinate system on the basis of measured values which have been obtained by means of a) and b) without having to displace either of said receiving unit and said longitudinal axis.

2. Device according to claim 1, wherein the computing means is fitted within the receiving unit.

3. Device according to claim 1, wherein the computing means is an computer which is connected to the receiving unit is external thereof.

4. Device according to claim 1, wherein said bodies are one of shafts, rollers and other rotationally symmetric bodies; and wherein the light emission device emits a light beam oriented parallel to a an axis of rotation of the bodies.

5. Device according to claim 1, wherein the receiving unit comprises two mutually spaced optoelectronic sensors for determining the direction of reception of a light beam, each of which is capable of individually determining the position of a light spot incident on them according to at least two directions or coordinates.

6. Device for mutually aligning bodies with a combined position-measuring sensor, comprising a light emitting system for emitting a light beam oriented parallel to a defined axis, an adaptor with which the light emitting system is mountable onto a body to be aligned parallel to a longitudinal axis thereof, a receiving unit for receiving said light beam and having means for determining its own orientation relative to a predetermined spatially fixed coordinate system, and electronic computing means for a determining azimuth and elevation angular position of the adaptor and body with respect to said spatially fixed coordinate system by a) determining a specific angular alignment of the receiving unit relative to coordinates of the predetermined spatially fixed coordinate system and b) computing of the angular position of the adaptor relative to the predetermined spatially fixed coordinate system on the basis of measured values which have been obtained by means of a) based on reception of a light beam having a predefined direction of incidence relative to the receiving unit without having to reference a previously measured longitudinal axis of another body.

7. Device according to claim 6, wherein the computing means is fitted within the receiving unit.

8. Device according to claim 6, wherein the computing means is an computer which is connected to the receiving unit is external thereof.

9. Device according to claim 6, wherein said bodies are one of shafts, rollers and other rotationally symmetric bodies; and wherein the light emission device emits a light beam oriented parallel to a an axis of rotation of the bodies.

10. Process for mutually aligning bodies using a combined position-measuring sensor having a light emitting system for emitting a light beam oriented parallel to a defined axis, an adaptor with which the light emitting system is mountable onto a body to be aligned, and a receiving unit for receiving said light beam, and electronic computing means for a determining azimuth and elevation angular positions of the adaptor and body with respect to a spatially fixed coordinate system comprising the steps of a) mounting said adaptor on a body to be aligned with said defined axis parallel to a longitudinal axis of said body b) determining a specific angular alignment of the receiving unit relative to coordinates of a predetermined spatially fixed coordinate system c) determining a direction of reception of the light beam from the light emitting system relative to specific housing dimensions of the receiving unit and c) computing of the azimuth and elevation angular position of the adaptor relative to the predetermined spatially fixed coordinate system on the basis of measured values which have been obtained by means of a) and b) without having to displace either of said receiving unit and said longitudinal axis.

11. Process according to claim 10, wherein the direction of reception of a light beam is undertaken with the aid of two mutually spaced optoelectronic sensors, the sensors being capable in each instance of individually determining the position of a light spot incident on them according to at least two directions or coordinates.

12. Process according to claim 10, wherein said bodies are one of shafts, rollers and other rotationally symmetric bodies; and wherein a light beam from the light emission device is oriented parallel to an axis of rotation of the bodies.

13. Process for mutually aligning bodies using a combined position-measuring sensor having a light emitting system for emitting a light beam oriented parallel to a defined axis, an adaptor with which the light emitting system is mountable onto a body to be aligned, and a receiving unit for receiving said light beam, and electronic computing means for a determining azimuth and elevation angular positions of the adaptor and body with respect to a spatially fixed coordinate system comprising the steps of a) mounting said adaptor on a body to be aligned with said defined axis parallel to a longitudinal axis of said body b) determining a specific angular alignment of the receiving unit relative to coordinates of a predetermined spatially fixed coordinate system c) determining a direction of reception of the light beam from the light emitting system relative to specific housing dimensions of the receiving unit and c) computing of the azimuth and elevation angular position of the adaptor relative to the predetermined spatially fixed coordinate system on the basis of measured values which have been obtained by means of a) and b) without having to reference a previously measured longitudinal axis of another body.

14. Process according to claim 13, wherein the direction of reception of a light beam is undertaken with the aid of two mutually spaced optoelectronic sensors, the sensors being capable in each instance of individually determining the position of a light spot incident on them according to at least two directions or coordinates.

* * * * *